Figure 1:
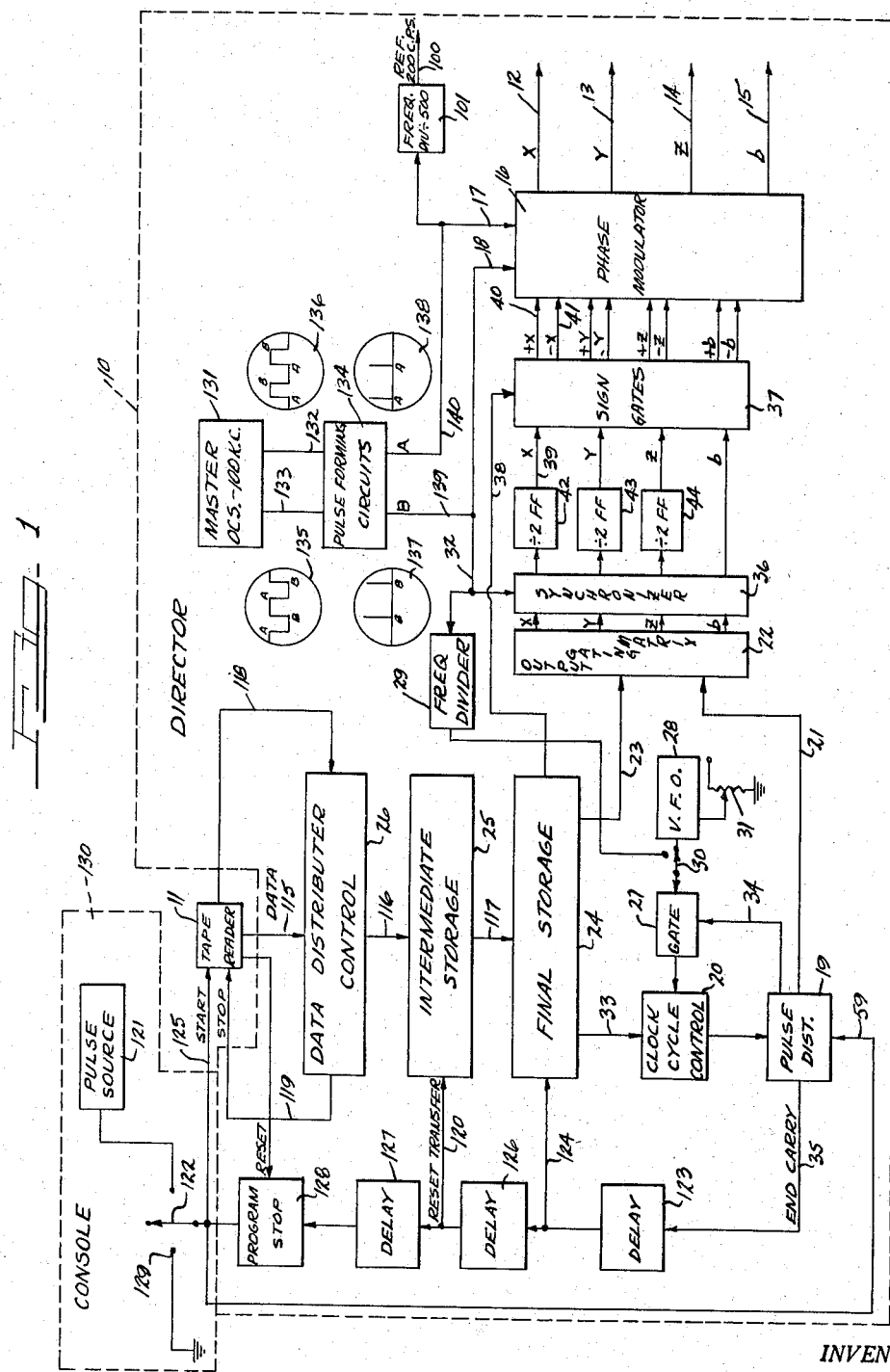

March 26, 1968     P. H. McGARRELL     3,375,354
SIGNAL GENERATING CIRCUITS FOR MACHINE TOOL CONTROL SYSTEMS
Original Filed March 31, 1958     3 Sheets-Sheet 1

INVENTOR.
Paul Harry McGarrell
BY
ATTORNEYS

March 26, 1968 P. H. McGARRELL 3,375,354
SIGNAL GENERATING CIRCUITS FOR MACHINE TOOL CONTROL SYSTEMS
Original Filed March 31, 1958 3 Sheets-Sheet 2

INVENTOR.
Paul Harry McGarrell

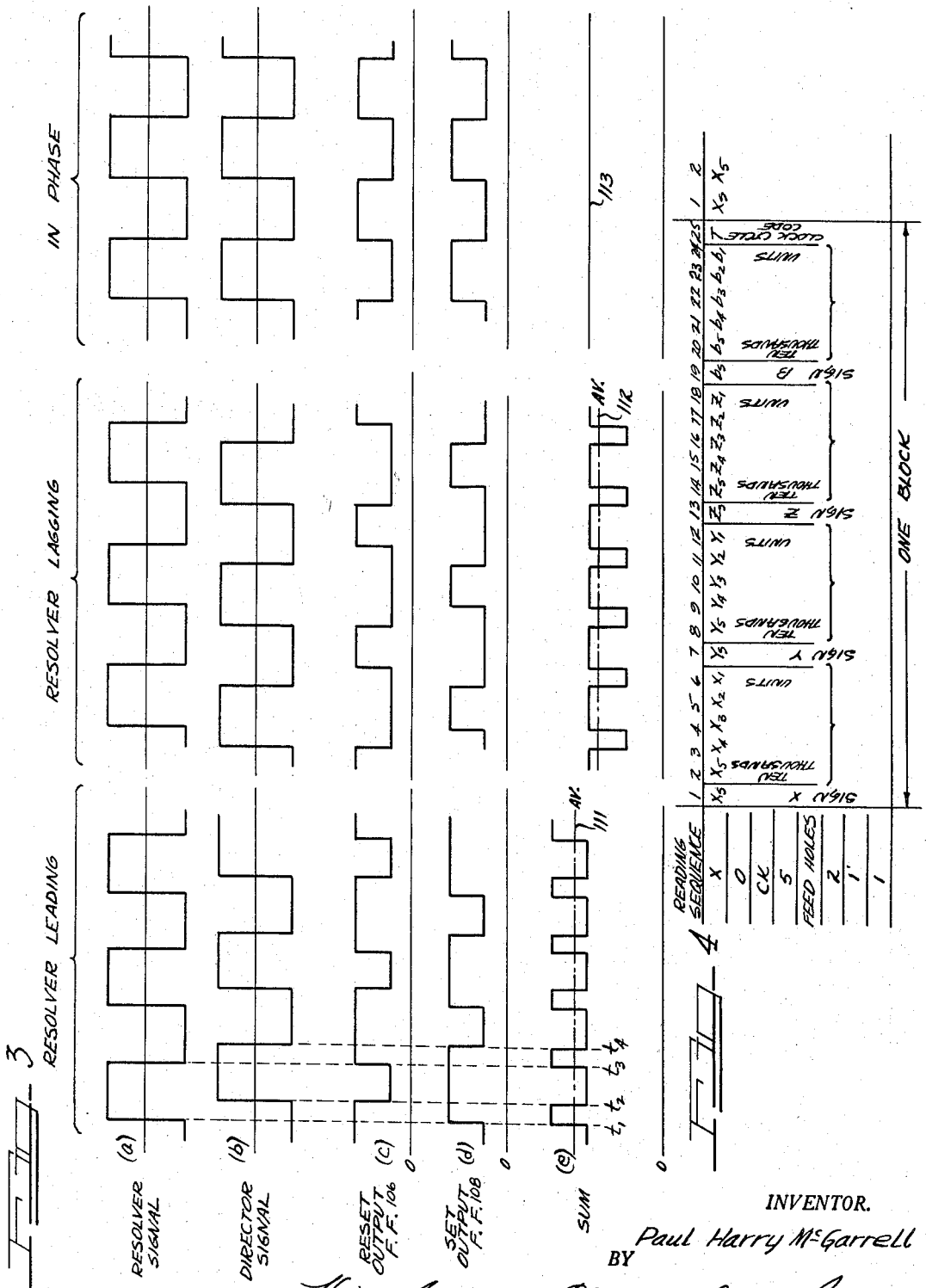

United States Patent Office 3,375,354
Patented Mar. 26, 1968

3,375,354
SIGNAL GENERATING CIRCUITS FOR MACHINE TOOL CONTROL SYSTEMS
Paul Harry McGarrell, South Euclid, Ohio, assignor, by mesne assignments, to The Bunker-Ramo Corporation, Stamford, Conn., a corporation of Delaware
Original application Mar. 31, 1958, Ser. No. 725,414. Divided and this application Feb. 15, 1961, Ser. No. 89,567
22 Claims. (Cl. 235—151.11)

The circuits of this invention have other applications but were particularly designed for use in a system for the automatic control of machine tools, and this application is a division of my copending application entitled, "Automatic Machine Tool Control," Ser. No. 725,414, filed Mar. 31, 1958, now U.S. Patent No. 3,079,522 issued Feb. 26, 1963, wherein a complete automatic control system is disclosed.

This invention relates to signal generating circuits and more particularly to circuits used in responding to digitally coded signals to develop analog signals for control of a machine tool or the like. The circuits of this invention are very accurate and reliable in operation and yet are versatile and comparatively simple in operation and construction.

In the operation of the complete system, servo systems are controlled in accordance with a block of information on a section of punched tape, to move a machine tool element a certain distance along or about each of a plurality of axes of movement, in a certain interval of time. For example, in milling a particular part a cutting tool may be moved vertically a distance of 1.2547 inches in an interval of five seconds while moving in one horizontal direction a distance of 0.0036 inch. In the same five second interval, a worktable of the machine may be moved in a transverse horizontal direction a distance of 2.7405 inches and a workholder on the worktable may be moved about a horizontal axis through an angular distance of 3°. Such movements are obtained by punching holes at appropriate positions in the tape fed to the tape reader.

The complete machine tool control system has a plurality of channels each of which corresponds to one of the directions of movement. Each channel comprises a pulse generating circuit which generates in a certain time interval a train of pulses with the number of pulses proportional to the desired amount of movement. In the above example, the pulse generating circuit which controls vertical movement of the cutting tool may generate 12,547 pulses in an interval of five seconds while in the same interval, the pulse generating circuit used to control horizontal movement of the cutting tool may generate only thirty-six pulses.

According to this invention, the pulse train generated by the pulse train generator of each channel is used to gradually shift the phase of a square wave command signal, preferably a 200 cycle signal. Each square wave command signal is applied to a phase detector which compares the phase of the signal with the phase of a 200 cycle square wave reference signal, to control a servo system which moves a machine tool element along or about one axis. As the element moves, an error device in the form of a resolver responds to the movement and shifts the phase of the reference signal toward that of the command signal. After effecting the control in accordance with one train of pulses, the total accumulative phase shifts of both the command and reference signals are equal to each other and are proportional to the movement of the machine tool element.

According to an important feature of the invention, the 200 cycle square wave command signal is generated by means of a divide-by-five hundred frequency divider or count-down circuit having an input coupled through a gate circuit and through an adder circuit to a fixed frequency 100 kc. pulse signal source. Prior to reading of a block of tape information, the 200 cycle command signal is generated solely from the 100 kc. pulse signal and is of fixed phase. After a block of information is read, the corresponding train of pulses from the pulse generating circuit is applied either to the gate circuit or through the adder circuit to the input of the frequency divider, to shift the phase in one direction or the other. When applied to the gate circuit, each pulse deletes one of the pulses from the 100 kc. source to create a certain phase lag in the output of the frequency divider. When applied to the adder circuit, each command pulse is applied to the frequency divider at a time between pulses from the 100 kc. source to create a certain phase lead in the output of the divider. After application of a train of pulses, the phase of the 200 cycle command signal is shifted in one direction or the other by a total amount exactly proportional to the number of pulses in the train. The pulses are selectively applied to the gate circuit or to the adder circuit in accordance with sign information on the tape.

Another important feature of this invention is in a system for receiving and storing information obtained from sections of the tape, wherein one block of information is used to generate a train of pulses, while another block of information is received from reading means and stored, in a manner to permit substantially continuous operation.

A further important feature of the invention resides in the construction of a phase detector responsive to command and reference signals to develop an output signal corresponding to differences in phase therebetween. The phase detector or demodulator of his invention is very accurate and reliable in operation.

Still another feature of this invention resides in a system for controlling the time interval during which a controllable number of pulses is generated. According to this invention, a plurality of divider or count-down circuits are provided for generating pulses signals of various harmonically related frequencies, and selectively operable gate circuits are used for applying output pulses of a desired frequency to a pulse generator circuit.

Still further features of the invention reside in a circuit for continuously adjusting the frequency of a signal applied to a pulse train generator, and in a circuit for accurately synchronizing randomly produced pulses with reference pulses. Such circuits are particularly advantageous in combination with the phase modulating system as above described.

Figure 2:
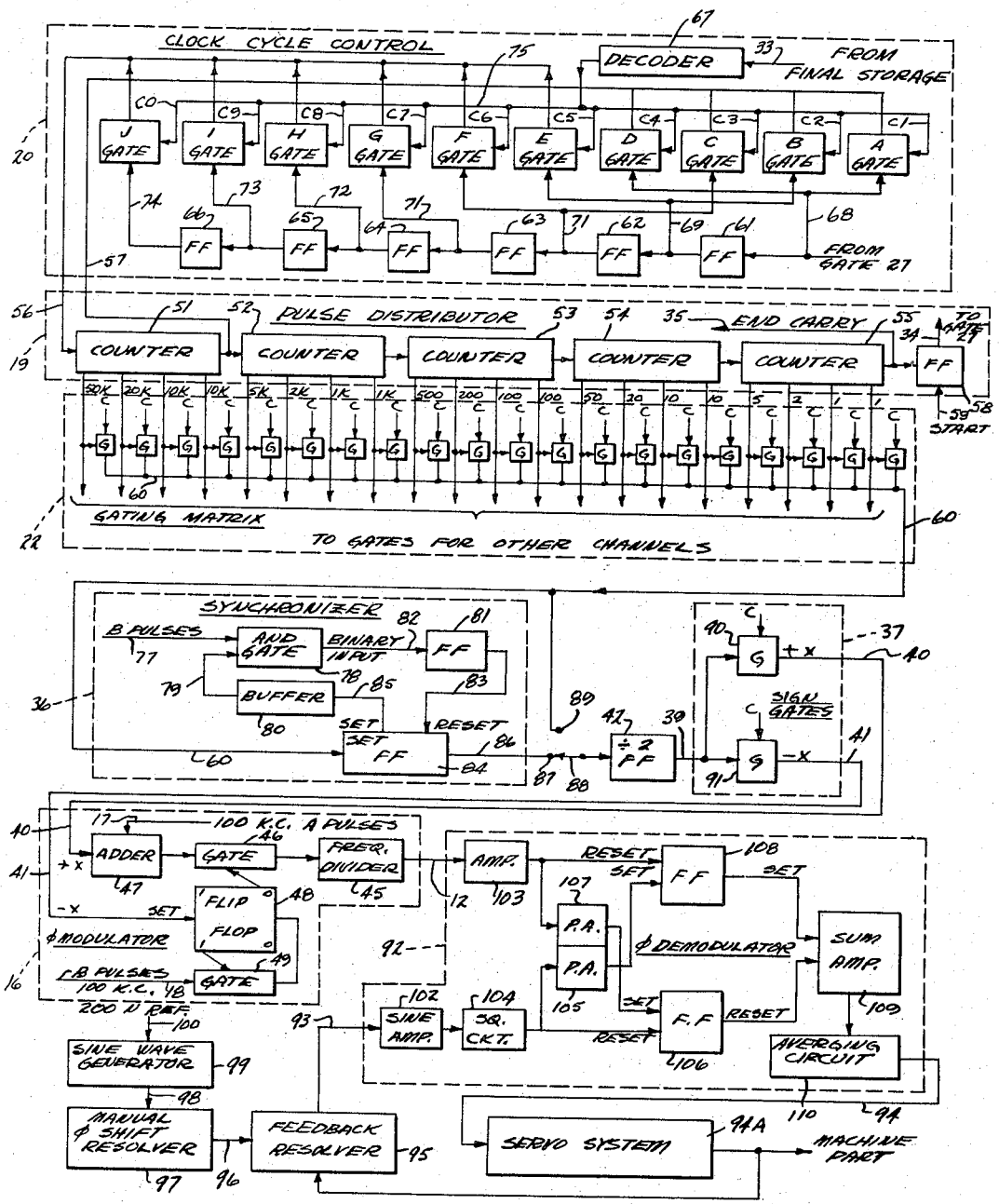

This invention contemplates other and more specific objects, features and advantages which will become more fully apparent from the following detailed description taken in conjunction with the accompanying drawings which illustrate preferred embodiments and in which:

FIGURE 1 is a block diagram showing a director and its connection to a tape reader, the director having four channels each operative to develop a phase-modulated square wave command signal;

FIGURE 2 is a schematic diagram showing certain circuits of the director of FIGURE 1 including a clock cycle control, a pulse distributor, one channel of a gating matrix, one channel of a synchronizer, one channel of a sign gate circuit and one channel of a phase modulator, and also showing a phase demodulator and servo system responsive to the phase-modulated output of one channel of the director of FIGURE 1;

FIGURE 3 is a diagram showing the waveforms at various points in the phase demodulator circuit of FIGURE 2, under various conditions of operation; and FIGURE 4 is a diagram showing the format of a section of tape used in controlling the director of FIGURE 1.

FIGURE 1 is a block diagram of a director 10 which is controlled by a tape reader 11. The director has four channels each of which is operative to generate a 200 cycle square wave command signal which is phase-modulated in accordance with information on the tape, and such command signals are used to control servo systems to control movement of machine tool elements along or about certain axes. For example, a square wave command signal developed on an output line 12 by an $x$ channel of the system may be used to control vertical movement of a cutting tool. A square wave command signal developed on output line 13 by a $y$ channel may be used to control horizontal movement of the cutting tool in one direction. A command signal developed on an output line 14 by a $z$ channel may be used to control movement of a worktable of the machine in a transverse horizontal direction, and a command signal developed on an output line 15 by a $b$ channel of the system may be used to control movement of a workholder on the worktable about a horizontal axis.

The output lines 12–15 are connected to the outputs of channels of a phase modulator 16. The modulator 16 is supplied with 100 kc. A and B pulses through lines 17 and 18, the A and B pulses being out of phase with each other. After a block of information is read, trains of pulses may be applied to the phase modulator 16 to gradually shift the phase of the 200 cycle signals, in either a lagging or a leading direction.

To develop the pulse trains for application to the phase modulator 16, a pulse distributor 19 is provided which is arranged to complete a cycle of operation in response to application of a certain number of input pulses thereto from a clock cycle control 20. The pulse distributor generates a plurality of series of pulses which are applied through a cable 21 to an output gating matrix 22 which is connected through a cable 23 to a final storage section 24. The final storage section 24 receives information from an intermediate storage section 25 which, in turn, receives information from the tape reader 11 through a data distributor control 26.

In operation, the output gating matrix 22 generates four trains of output pulses in each cycle of operation of the pulse distributor 19. Each train of pulses is equal in number to a controllable fraction of the number of input pulses applied to the pulse distributor 19, as controlled by the information contained in final storage 24.

The clock cycle control 20 receives input pulses through a gate 27 from either a variable frequency oscillator 28 or a frequency divider 29, dependent upon the position of a switch 30. The frequency of the oscillator 28 may be adjusted by applying an adjustable control voltage thereto through a potentiometer 31. The frequency divider 29 is supplied with a 100 kc. input signal through a line 32 so that its output frequency is fixed.

In operation, the clock cycle control is controlled from final storage through a cable 33 to apply pulses to the pulse distributor 19 at a rate equal to a sub-multiple of the output frequency of the variable frequency oscillator 28 or the frequency divider 29, dependent upon the position of switch 30. The pulse distributor 19 completes a cycle of operation after application of a certain number of input pulses thereto and at the end of the cycle, a pulse is applied through line 34 to gate circuit 27 to cut off the supply of pulses. At the same time, an end-carry pulse is generated on line 35, to control final storage, intermediate storage and the tape reader in a manner to be described hereinafter.

The four trains of pulses developed by the gating matrix 22 in each cycle of operation of the pulse distributor 19 are applied through a synchronizer 36 and through sign gates 37 to inputs of the phase modulator. The synchronizer 36 is used when the variable frequency oscillator 28 is operative, to synchronize the pulses of the trains developed by the gating matrix 22 with the B pulses applied to the phase modulator 16, in order to obtain proper operation of the phase modulator, as is described hereinafter. The sign gates 37 are controlled from final storage through a cable 38 and serve to control the application of the train of pulses of each channel to either of two inputs to the phase modulator 16, to develop either a phase lead or a phase lag in the corresponding output signal. For example, a train of pulses of the $x$ channel applied to sign gates 37 on line 39, is applied to the phase modulator 16 either through a $+x$ line 40 or a $-x$ line 41, dependent upon the information contained in final storage 24 from a block of information on the tape. When applied through the $+x$ line 40, the train of pulses produces a phase lead in the square wave output signal on line 12, while when applied on the $-x$ line 41, the train of pulses produces a phase lag in the output signal on line 12. The sign gates 37 control the application of pulses in the $y$, $z$ and $b$ channels in a similar fashion.

It should be noted that divide-by-two flip-flops 42, 43 and 44 are provided between the synchronizer 36 and the sign gates 37 in the $x$, $y$ and $z$ channels in order to obtain a desired ratio between information coded on the tape and corresponding movement of machine tool elements in a particular system. The flip-flops 42–44 are not necessarily required.

Other features of the construction of the director 10 as shown in FIGURE 1 will be described in detail hereinafter after first describing the circuits shown in detail in FIGURE 2.

FIGURE 2 shows the circuits of the pulse distributor 19 and the clock cycle control 20, the $x$ channel of the gating matrix 22, the $x$ channel of the synchronizer 36, the $x$ sign gates, and the $x$ channel of the phase modulator 16. In addition, FIGURE 2 shows in the lower portion thereof the servo system for responding to the output of the $x$ channel of the phase modulator to control movement of a machine tool element or the like.

*Phase modulator 16*

Considering first the phase modulator 16, this circuit as above noted generates a 200 cycle output signal on line 12 which is gradually shifted in phase in either a leading or a lagging direction in response to a train of pulses applied thereto, the number of pulses in the train being determined by information coded on the section of punched tape used in controlling the system. The circuit 16 comprises a frequency divider 45 having an input connected through a gate circuit 46 and an adder circuit 47 to a source of 100 kc. pulses applied through the line 17. Prior to reading of a block of tape information, the frequency divider 45 is controlled solely by the 100 kc. pulses and the output of the frequency divider is a 200 cycle square wave signal of fixed phase. After a block of information is read from the tape, a train of command pulses is applied either through the $+x$ line 40 to the adder circuit or through the $-x$ line 41 to a flip-flop circuit 48 which controls the gate circuit 46. When a train of $+x$ command pulses is applied through line 40, each pulse is applied to the frequency divider 45 at a time between pulses from the 100 kc. source to create a certain phase lead in the output of the divider. On the other hand, when a train of command pulses is applied over the $-x$ line 41, each pulse operates the flip-flop circuit 48 to close the gate 46 and delete one of the 100 kc. pulses. Thus a certain phase lag is created in the output of the frequency divider.

The command pulses, whether applied over the $+x$ line 40 or the $-x$ line 41, are in phase with the B pulses applied to the frequency divider 29 or the synchronizer 36 in FIGURE 1 and are hence out of phase with the 100 kc. A pulses applied through line 17 to the adder 47. To properly operate the gate 46 so as to delete only one of the 100 kc. A pulses in response to each $-x$ command pulse applied over line 41 it is necessary that the gate 46 be closed only for a certain time interval. This is accomplished by applying a reset signal to the flip-flop 48 through a gate circuit 49 having an input connected through the line 18 to a source of the B pulses.

In operation, the flip-flop circuit 48 is normally in a reset condition and the gate 46 is open. When a −x command pulse is applied through line 41, the flip-flop circuit 48 is placed in a set condition and the gate circuit 46 is closed to delete the next A pulse applied from conductor 28. At the same time, the gate 49 is opened and the next B pulse applied through line 18 serves to reset the flip-flop 48, to again open the gate 46 while closing the gate 32.

It may be noted that the frequency divider 45 must be a divide-by-500 divider, to produce a 200 cycle output with a 100 kc. input. With this ratio, each command pulse shifts the phase by an amount equal to 360° divided by 500, i.e., 0.72°. It may be further noted that the trains of pulses are so generated that the pulses are fairly uniformly distributed within each train (although not usually exactly uniformly distributed) so that the phase shift is gradual. This is important in permitting the servo system to properly follow the modulations of the 200 cycle square wave signal.

Pulse distributor 19 and gating matrix 22

The pulse distributor 19 together with the gating matrix 22 form a pulse train generator, the output thereof being applied through the synchronizer 36 and the sign gates 37 to the phase modulator to phase modulate the 200 cycle square wave output signal thereof.

In general, the pulse distributor 19 is arranged to complete a cycle of operation in response to application of a certain number of input pulses thereto and is arranged to generate in each cycle of operation a plurality of series of pulses, which series are selectively combined through gates in the gating matrix to create a train of pulses having the desired number of pulses.

The illustrated pulse distributor 19 comprises five decade counters 51, 52, 53, 54 and 55 which are connected in cascade. An input pulse signal may be applied either to the input of the first counter 51 through a line 56, or to the input of the second counter 52 through a line 57. The final counter 55 reaches a count of ten to complete a cycle of operation when one hundred thousand pulses are applied to the input of the first counter 51 through the line 56, or when ten thousand pulses have been applied to the input of the second counter 52 through the line 57. Upon completion of a cycle of operation, an end-carry pulse is developed on the line 35 and at the same time, the pulse is applied to a flip-flop circuit 58. Flip-flop circuit 58 then applies a signal through line 34 to the gate circuit 27 (FIGURE 1) to cut off the supply of pulses to the clock cycle control 20 and thereby cut off the supply of pulses to the pulse distributor. To initiate another cycle, a reset signal may be applied to the flip-flop 58 over a line 59 to apply a control signal through line 34 to the gate 27, so as to open the gate 27 and permit supply of pulses to the input of the pulse distributor until it again completes a cycle of operation.

Each of the counters 51–55 is arranged to generate four series of pulses in each cycle of operation thereof, the numbers of pulses in the four series being selectively addable to produce any number from one through nine. Preferably, the first series has five pulses therein, ahe second series has two pulses therein and the third and fourth series have one pulse each. The series of pulses are so generated that the pulses of each series are non-coincident with the pulses of each of the other series. Accordingly, they may be selectively applied through gate circuits labeled G in the gating matrix 22 to a common output line 60. It should also be noted that the pulses generated by each counter are non-coincident with the pulses generated by each of the other counters, so that the outputs of all counters may be applied to the common output line 60 through the gates of the gating matrix 22.

To generate a train of 54,321 pulses, for example, the gates of the gating matrix may be opened corresponding the first or "50K" output of the first counter, the "2K," "1K" and "1K'" outputs of the second counter, the "200" and "100" outputs of the third counter, the "20" output of the fourth counter and the "1" output of the fifth counter. Such gates are controlled from the final storage section through the cable 23, to apply appropriate control signals to the inputs marked C in FIGURE 2.

It should be noted that the particular construction of the counters 51–55 and the operation of the pulse generating circuit are disclosed in detail in my parent application identified above, and are also disclosed and claimed in a divisional application separate from this application. As such, such circuits form no part of the present invention, but it is important that a pulse train generator be used in which the pulses are substantially uniformly distributed within each train.

Clock cycle control 20

As described above, the clock cycle control circuit 20 responds to pulses applied thereto through the gate 27 from either the variable frequency oscillator 28 or from the frequency divider 29, dependent upon the position of switch 30, to apply pulses to the input of the pulse distributor 19 at a rate equal to a sub-multiple of the pulses applied to the input of the clock cycle circuit. The particular sub-multiple that is used, is controlled from final storage through the cable 33.

In general, the clock cycle control circuit 20 comprises a series of frequency divider or count-down circuits connected in cascade, in the form of a series of flip-flop circuit 61, 62, 63, 64, 65 and 66 which operate as divide-by-two circuits. The various frequencies generated through the cascaded series of flip-flops 61–66 are applied through gate circuits labelled A through J to line 56 or line 57 to be applied to the pulse distributor 19. The gate circuits A through J are controlled by signals applied from a decoder 67 which is coupled through line 33 to the final storage section 24.

For purposes of discussion, it may be assumed that a 20 kc. input signal is applied to the clock cycle control which is the case when the divide-by-five frequency divider 29 is used. When the variable frequency oscillator is used, the frequency may be varied through a range having an approximate mid-point at 20 kc.

The input to the clock cycle control from gate 27 is applied directly to the A and B gates through a line 68, as well as to the input of the flip-flop 61. The 10 kc. output of flip-flop 61 is applied over a line 69 to the B gate and also to the E gate. The five kilocycle output of flip-flop 62 is applied over line 70 to the C gate and the F gate. The 2.5 kilocycle output from flip-flop 63 is applied over line 71 to the G gate, the 1.25 kilocycle output from flip-flop 64 is applied over line 72 to the H gate, the 625 cycle output from flip-flop 65 is applied over line 73 to the I gate, and the 312.5 cycle output from flip-flop 66 is applied over line 74 to the J gate.

The clock cycle code letter which is associated with each command and which is stored in final storage element 24 for the command being executed, is applied over the line 33 to the decoder 69. The output from decoder 67 is applied over a ten-channel cable 75, one channel of which is connected to the control terminal of one of the respective clock cycle gates as by control lines C–1, C–2, C–3, C–4, C–5, C–6, C–7, C–8, C–9 and C–0. Thus, if the command in final storage includes the clock cycle tape code letter A, the inputs to the decoder 67 are so actuated that the output of decoder 67 will supply a signal which holds gate A open but which holds all of the other clock cycle gates closed. That is to say, only the one particular clock cycle gate called for by the clock cycle code letter in final storage will be held open during the entire period of execution of the command, while other clock cycle gates are closed. Decoder 67 is essentially nothing more than a binary-decimal to decimal converter and includes circuitry all of which is well-known in the art. For example, the decoder may consist of a diode logic network including "and" circuits and "or" circuits. Such a network can be designed by well-known techniques of Boelean algebra to satisfy the above noted logical or functional requirements.

It is thus seen that if clock cycle code letter A has been read from the tape by the tape reader 11 and transferred into final storage 24, the decoder 67 will have sensed the letter A in final storage and the clock cycle A gate will be open while all other clock cycle gates are closed.

As soon as the start pulse is applied over line 59 to flip-flop 58 thereby opening gate 27 and applying the 20 kilocycle input from frequency divider 29 to the chain of flip-flop dividers in the clock cycle 20, the 20 kilocycle input will be applied over line 68 through the open A gate and thence over line 57 to the trigger input terminal of the tens decade of the pulse distributor counter. The counter will then count ten thousand of these twenty-thousand-per-second pulses and will thus emit the output carry pulse over line 35 exactly at the end of one-half second. This same pulse also resets flip-flop 58 thus shutting off the 20 kc. input to the clock cycle control 20 and the same pulse is also used to perform other functions to be described, including transfer of another command to the final storage section 24. Let us assume that the next command contains the clock cycle code letter B. Decoder 67 now puts out a signal which opens the clock cycle B gate and loses all other clock cycle gates. Hence, the 20 kilocycle output from gate 27 is now passed through flip-flop 61 and the 10 kilocycle output of this flip-flop is applied over line 69 and through the B gate to line 57 and thence to the trigger input of the tens decade 52. The counter will now take exactly one second to count ten thousand of the 10 kilocycle pulses before emitting its end-carry pulse which starts the process over again. Similarly, it will be seen that if the C gate of the clock cycle control is open, a 5 kilocycle input is applied to line 57 and the pulse distributor counter will complete its count of 10,000 and emit its end-carry pulse at the end of exactly two seconds.

It will be noted, however, that each of the remaining gates D through J of the clock cycle control are connected over line 56 to the trigger input terminal of the units decade 51 of the pulse distributor. Thus, if the D gate is open, the 20 kilocycle output from gate 27 is directly applied to line 56. The counter now, however, makes a count of 100,000 before emitting its end-carry pulse. Since the input pulses from gate D occur at the 20,000-per-second, the count will be completed at the end of 5 seconds. Similarly, a 100,000 count of 10 kilocycle pulses from gate E is completed at the end of 10 seconds, the 100,000 count of five kilocycle pulses from gate F is completed at the end of 20 seconds, a 100,000 count of 2.5 kilocycle pulses from gate G is completed at the end of 40 seconds, a 100,000 count of 1.25 kilocycle pulses from gate H is completed at the end of 80 seconds, a 100,000 count of 625 cycle pulses from gate I is completed at the end of 160 seconds, and a 100,000 count of 312.5 cycle pulses from gate J is completed at the end of 320 seconds.

It is thus seen that the binary-decimal code for each of the letters A through J and stored for each command in final storage unit 24 as shown in FIGURE 1 can, by means of the apparatus shown in FIGURE 2, control the exact length of time during which a separate train of output pulses is emitted from pulse distributor 19 over line 21 for each of the four axes of motion channels $x$, $y$, $z$, and $b$. Of course, when the variable frequency oscillator 28 is used, the cycle duration may be controlled by adjustment of the potentiometer 31 over a certain range.

Synchronizer 36

The synchronizer 36 responds to randomly produced input pulses fed to it from the gating matrix 22 through the line 60, to produce in response to each input pulse an output pulse which is synchronized with a B pulse, to obtain proper operation of the phase modulator 16. This synchronization is necessary when the variable frequency oscillator 28 is used, since there is then an indefinite or random phase relation between pulses from the gating matrix and the 100 kc. pulses fed to the phase modulator. It is noted that when the frequency divider 29 is used, the pulses of the pulse train developed by the gating matrix 22 are synchronized with the B pulses and the synchronizer 36 is not required. Referring to FIGURUE 2, reference B pulses are applied over a line 77 to one of two input terminals of a coincidence "and" gate 78. "And" gate 78 may be any circuit having at least two input terminals and one output terminal and being so connected that an output pulse applied to one of the input terminals will appear at the output terminal only if a second signal is simultaneously applied to the other terminal which in FIGURE 2 is shown connected by a line 79 to the output of a buffer amplifier stage 80 which operates in a manner to be described below. The output of "and" gate 78 is applied to the binary input terminal of a flip-flop 81 over a line 82. The reset output terminal of flip-flop 81 is connected by a line 83 to the reset input terminal of a second flip-flop 84. The set output terminal of flip-flop 84 is connected by a line 85 to the input of buffer amplifier 80. The random information pulses from output gating matrix 22 are applied over the line 60 to the set input terminal of flip-flop 84 while the synchronized output pulses are derived on a line 86 which is connected to the reset output terminal of flip-flop 84. The mode of operation by which the synchronizer circuit of FIGURE 2 synchronizes each of the random information pulses on line 60 with one of the fixed frequency reference B pulses on line 77 to provide one synchronized output pulse on line 86 for each random information pulse applied to input line 60 is as follows. It will be noted that the set output terminal of flip-flop 84 is connected through line 85 and buffer amplifier 80 (which may conveniently be an emitter follower transistor amplifier stage) and line 79 to one input terminal of gate 78. Thus, gate 78 is controlled by the output of flip-flop 84 so that the gate is enabled or open when the flip-flop 84 is in its set condition and so that the gate 78 is disabled or closed when flip-flop 84 is in its reset condition. As will appear from the discussion below, the normal state of both the flip-flop 81 and the flip-flop 84 is the reset state so that gate 78 is normally closed.

When one of the random information pulses is applied over line 60 to the set input terminal of flip-flop 84, the state of this flip-flop is changed from its reset to its set condition thereby providing a signal over line 85 which is applied through buffer amplifier 80 to enable the gate 78. Prior to this occurrence, of course, the regularly recurring fixed frequency B pulses applied over line 77 to gate 78 have not been passed since the gate was in a closed condition. As soon, however, as an information pulse sets flip-flop 84 thereby opening gate 78, the next B pulse which occurs on line 77 will be passed through "and" gate 78 and applied over line 82 to the binary input terminal of flip-flop 81. Output is taken from flip-flop 81 over line 83 which is connected from the reset output terminal of flip-flop 81. Hence, if flip-flop 81 is already in its reset condition, the first B pulse applied over line 82 to its binary input terminal will simply set the flip-flop to its set condition but will not provide an output over line 83. Gate 78 therefore remains open and the next B pulse which occurs will again be passed and applied over line 82 to flip-flop 81 which is now set and will therefore be changed to its reset condition to consequently provide an output pulse over line 83.

This pulse from the reset output terminal of flip-flop 81 is applied over line 83 to the reset input terminal of flip-flop 84. It will be recalled that the cycle of operation of the circuit was initiated by a random information pulse applied to the set input terminal of flip-flop 84 over line 60. Therefore, the flip-flop 84 will necessarily be in its set condition and the reset pulse applied from flip-flop 81 over line 83 will reset flip-flop 84. This action has two effects. First, it generates an output pulse on line 83 which is connected to the reset output terminal of flip-flop 84. This output pulse is thus synchronized in time with the B pulse from line 77 which was passed through the "and" gate 78 and reset the flip-flop 81. Secondly, the reset pulse on line 83 returns the flip-flop 84 to its reset condition thereby disabling "and" gate 78 until such time as another information pulse is applied to flip-flip 84 over line 60.

It is thus seen that the reset pulse from flip-flop 81 which generates the synchronized output from the reset output terminal of flip-flop 84 also closes the "and" gate 78 so that future reference or fixed frequency B pulses will not be passed until another information pulse is applied to flip-flop 84 over line 60. The circuit is thus normally in a quiescent state with flip-flop 81 and 84 both in the reset condition and with gate 78 normally closed until a random information pulse is applied to it. When such a pulse is applied, the circuit will generate one, and only one, output pulse on line 86 which will be synchronized in time with one of the B pulses applied over input line 77.

Normally, of course, the random pulse on line 60 will not initially occur at the same time as one of the B pulses on line 77. However if by chance the random information pulse should occur in time coincidence with one of the B pulses so that the set output from flip-flop 84 is applied through buffer 80 to gate 78 at the same time as one of the B pulses, one of two things may happen depending upon circuit timing of the order of fractions of microseconds. The B pulse may be passed by the "and" gate or it may not be passed. In practice, however, this uncertainty poses no real problem since if this B pulse is passed then the circuit operates as discussed above. On the other hand, if this B pulse is not passed, then the next B pulse which occurs will be passed since it will be understood that the set output signal derived from flip-flop 84 and applied through buffer 80 to the "and" gate 78 is a continuing signal which persists until the flip-flop 84 is returned to its reset condition by the pulse emitted over line 83 from flip-flop 81.

It will thus be seen that the circuit of the synchronizer 36 provides a means for synchronizing each one of a train of randomly occurring pulses from a first pulse source with one pulse from a train of fixed frequency reference pulses derived from a second source. Although this particular synchronizing circuit is particularly adapted for the needs of the system as disclosed, it will be understood that this circuit, as well as other circuits discussed here may find general application in systems other than that disclosed herein.

The output line 86 of the synchronizer 36 is connected to a fixed switch contact 87 which is engageable by a movable switch contact 88 connected to the flip-flop 42, which is connected through line 39 to the sign gates 37. When the synchronizer 36 is not required, as when the frequency divider 29 in FIGURE 1 is used, contact 88 may be engaged with a fixed contact 89 connected to the line 60, to thereby by-pass the synchronizer 36.

Sign gates 37

Two gates are provided for each channel, a $+x$ gate 90 and a $-x$ gate 91 being provided for the $x$ channel as shown in FIGURE 2. The inputs for both gates are connected to the line 39 and the outputs of the gates 90 and 91 are respectively connected to the lines 40 and 41. A control signal is applied from final storage to either the gate 90 or the gate 91, through one of the lines identified by the reference character C.

When the $+x$ gate 90 is operative, the train of pulses is applied through the line 40 to the $+x$ input of the phase modulator 16, to produce a phase lead in the 200 cycle square wave generated at the output line 12. Similarly, when the $-x$ gate 91 is operative, a phase lag is produced in the 200 cycle square wave at the output line 12.

Phase demodulator and servo system

Each of the director output lines 12–15 is connected to a servo system to control movement of a machine part. As shown in FIGURE 2, the output line 12 for the $x$ channel is connected to the input of a phase demodulator 92 which compares the phase of the 200 cycle square wave at line 12 with a 200 cycle sine wave signal applied at a line 93 and develops a DC output on a line 94 which is applied to the input of a servo system 94A having a mechanical output connected to a machine part, as diagrammatically illustrated. The mechanical output of the servo system is also coupled mechanically to a feedback resolver 95 having an electrical output connected to the line 93. An electrical input of the feedback resolver is connected through a line 96 which is connected to the output of a manual phase shift resolver 97 connected through a line 98 to a sine wave generator 99. A 200 cycle reference signal is applied through a line 100 to the sine wave generator, the reference signal being preferably developed by a frequency divider 101 having an input supplied with the 100 kc. A pulses.

In operation, a shift in phase of the 200 cycle square wave command signal applied through line 12 produces an output on the output line 94 of the phase demodulator 92 which is applied to the servo system 94A to cause movement of the machine part. As the machine part moves, the feedback resolver 95 shifts the phase of the 200 cycle signal applied on line 93 toward that of the command signal applied on line 12. After effecting control in accordance with one train of command pulses, the signal applied on line 93 is brought into phase with the command signal applied on line 12 and the total accumulative phase shifts of both the command and reference signals are equal to each other and are proportional to the movement of the machine tool element. It will be appreciated that the manual phase shift resolver 97 provides a manual override.

Important features of the invention reside in the construction and operation of the phase demodulator 92. The inputs to the phase demodulator 92 are first a 200 cycle sine wave which is applied from the feedback resolver over the line 93 to a sine wave amplifier 102 and secondly a 200 cycle square wave which is the command signal applied from director 10 over the $x$ channel output line 12 to a square wave amplifier 103. It is the function of the phase demodulator to compare the phase of these two inputs and produce a DC or unidirectional output voltage whose magnitude and polarity is in direct proportion to this phase difference.

In order to perform this function, the since wave output of amplifier 102 is converted to a square wave by squaring circuit 104. Many such squaring circuits are known in the art and circuit 104 may, for example, comprise a high gain amplifier followed by a clipper stage. It will be noted from FIGURE 2 that the output of both the squaring circuit 104 and the square wave amplifier 103 are each applied in two directions, first to a pulse amplifier and also to a flip-flop. Thus, the output of the squaring circuit 104 is applied both to a pulse amplifier 105 and to the reset input terminal of a flip-flop 106. Similarly, the output of square wave amplifier 104 is applied to a pulse amplifier 107 and is also applied to the reset input terminal of a flip-flop 108. Each of the pulse amplifiers 105 and 107 are connected to provide as an output a negative pulse each time the square wave input to the pulse amplifier goes positive. It will be noted that the negative pulse output from pulse amplifier 104 is applied to the set input terminal of the flip-flop 108 and that the negative pulse output from the pulse amplifier 107 is applied to the set input terminal of the flip-flop 106. It will also be noted that voltage outputs are derived from the reset output terminal of the flip-flop 106 and from the set output terminal of the flip-flop 108. These two outputs from flip-flops 106 and 108 respectively are applied to a summing amplifier 109, the output of which is in turn applied to an averaging circuit 110. The output of the averaging circuit 110 is in turn the DC signal which is applied over the line 94 to the servo system 94A.

The operation of the circuit of FIGURE 2 is illustrated in the waveform diagrams of FIGURE 3, and all of which voltage is plotted as ordinate against time as abscissa. Returning for the moment to FIGURE 2, however, it will be recalled that each of the flip-flops 106 and 108 have two input terminals, set and reset, and two output terminals, set and reset. Furthermore, the circuitry of each of the flip-flops 106 and 108 is such that neither input terminal of either flip-flop will respond to positive-going input signals, but only to negative-going input signals. If a negative pulse or negative-going signal is put into the reset input terminal of one of the flip-flops, the circuit will assume its reset state in which the voltage on its set output terminal is at some relatively low value and the voltage on its reset output terminal is at a relatively high value. Of course, if the flip-flop has previously been in the set state, the voltage on its set output terminal will drop to this relatively low value when the negative-going signal is applied to the reset input terminal and will remain at this value until a negative-going input signal is sent to the set input terminal of the flip-flop. When the flip-flop is already in its reset state, the application of more negative pulses to the reset input terminal will have no effect. The voltage at the reset output terminal is already at some relatively high voltage level and will remain there as noted above until a negative-going signal is applied to the set input terminal. Thus, whenever the set output is low, the reset output is high and vice-versa. Now, if a negative pulse or negative-going signal is applied to the set input terminal of a flip-flop which is in the reset state, the voltage levels of the set and reset output terminals will reverse. That is to say, the set output will rise to some relatively high voltage and will remain there whereas the reset output will drop to some relatively low voltage. As noted above, the circuits of flip-flops 106 and 108 are such that positive pulses or positive-going signals will not affect them.

Turning now to FIGURE 3, there is shown in graph (a) thereof a volt-time waveform diagram of the resolver feedback signal which is applied from squaring circuit 104 to flip-flop 106 and to pulse amplifier 105. In graph (b), there is shown a similar volt-time waveform diagram of the command signal from the director which is the signal applied from squaring amplifier 103 to flip-flop 108 and to pulse amplifier 107. In graphs (c) and (d) of FIGURE 3 there are respectively shown volt-time waveform diagrams of the reset output voltage of flip-flop 106 and of the set output voltage of flip-flop 108.

It will be noted that the graphs of the left-hand portion of FIGURE 3 assume that both of the flip-flops 106 and 108 are initially in the reset state. Thus the reset output of flip-flop 106 will be at a value which is relatively high by comparison to the set output of flip-flop 108. The first change occurs at time $t_1$ when the resolver signal goes positive as shown in graph (a) of FIGURE 3. This positive-going signal does not affect flip-flop 106 but the inverted pulse it produces from pulse amplifier 105 goes to the set input of flip-flop 108 causing its said output to rise as shown in graph (b) of FIGURE 3. The next change occurs at time $t_2$ when the director signal rises in the positive-going direction as shown in graph (b). This does not affect flip-flop 108 but again the inverted pulse produced by pulse amplifier 107 is applied to the set input terminal of flip-flop 106 causing the reset output of this flip-flop 106 to drop in the negative-going direction as shown in graph (c) of FIGURE 3. At time $t_3$, the resolver signal goes negative as shown in graph (a) of FIGURE 3. This negative-going signal, which is applied to flip-flop 106 directly, resets this flip-flop causing its reset output to rise as shown in graph (c) of FIGURE 3. Of course, the resulting positive pulse from pulse amplifier 105 has no effect upon flip-flop 108. Finally, the direction signal goes negative at time $t_4$ as shown in graph (d) of FIGURE 3. This negative signal applied from amplifier 103 to flip-flop 108 resets the flip-flop 108 causing its set output voltage to drop as shown in graph (d). Again, the resulting positive pulse applied from pulse amplifier 107 to the set input terminal of flip-flop 106 has no effect thereon. The cycle of operation then continues in the same manner producing the remainder of the waveforms shown in the left-hand section of FIGURE 3.

It will be noted that the graphs of the left-hand portion of FIGURE 3 show the operation when the resolver signal leads the director signal. When waveforms as shown in graphs (c) and (d) are applied to the summing amplifier 109, an output is developed as illustrated by the graph (e). This signal has an average value at a level as indicated by the broken line 111, and a corresponding DC output is developed from the averaging circuit 110 on line 94.

The central portion of FIGURE 3 is the same as the left-hand portion but illustrates the waveforms produced with the resolver signal lagging the director signal, rather than leading. It will be noted that the output of the summing amplifier 109 is quite different in form and its average value, as indicated by the broken line 112, is substantially lower than the average value of the output produced under the resolver leading condition.

The right-hand portion of FIGURE 3 illustrates the waveforms produced when the two signals are in phase. In this case, it will be noted that the output of the summing amplifier is a straight line, as indicated by reference numeral 113, at a level intermediate the levels obtained under leading and lagging conditions.

It may also be noted that in each case, the output of the summing amplifier 109 has a DC component of substantial value. This may be balanced out by providing an adjustable DC bucking voltage within the averaging circuit, or within the input of the servo system 94A, to produce a null condition when the signals are in phase, and to produce signals of one polarity under resolver leading conditions and of the opposite polarity under resolver lagging conditions.

The averaging circuit 110 may, for example, be a capacitor connected across the output of the summing amplifier, or it may be any well known circuit for deriving the first or DC term in the commonly known Fourier expansion for the pulse waveforms.

Tape reader and information storage control

Attention is invited first to FIGURE 4 which shows the format of a section of tape used in controlling the system. One or more holes are punched along each of twenty-five transverse lines which are spaced along the tape, such lines or groups of holes being read by the tape reader 11 in the sequence as indicated. The first six groups 1–6 control the x channel of the system to control movement of a machine element along or about one axis, group 1 being used to control the direction of movement and group 2–6 being used to control the magnitude of movement. Thus group 1 may control the sign gates 90 and groups 2–6 being used to control the magnitude of groups of gates which connect the outputs of counters 51–55 to the x output lines 60.

Groups 1–6 may, for example, control the vertical movement of a cutting tool. Groups 7–12 control the y channel to control the signal developed on output line 13 in FIGURE 1, and may control movement of the cutting tool in one horizontal direction. Groups 13–18 control the z channel and may control movement of a worktable of the machine in a transverse horizontal direction. Groups 19–25 control the b channel and may control movement of the workholder on the worktable about a horizontal axis.

The last group, group 25, is used to control the time interval during which the movements are accomplished, and may thus control the signal applied through decoder 67 to the gates A through J in the clock cycle control unit 20.

The program encoded on the tape is sensed by the tape reader 11 and is converted to an electrical output in which a binary one (corresponding to a hole in the tape) is represented by the presence of a pulse on a given channel at a predetermined point in time and a binary zero (corresponding to the absence of a hole at a given point on the tape) is represented by the absence of a pulse at the corresponding predetermined point in time. This output is applied over a cable 115 to the data distributor control section 26. The output of section 26 is connected through a cable 116 to the intermediate storage section 25 which is connected through a cable 117 to the final storage section 24. The data distributor 26 may, for example, consist of two cascaded ring counters each of which counts up to five and which together count up to twenty-five, i.e., the number of groups or characters in a complete block. The counter is driven by pulses generated by each separate incremental motion of a sprocket wheel or the like of the tape reader 11. These pulses are applied to the data distributor counters over a line 118. The counter, in turn, controls twenty-one sets of four gates each and four sets of one gate each so as to enable or open one set of gates for each particular count. The signals corresponding to sign information, i.e., those corresponding to groups or characters 1, 7, 13 and 19 in FIGURE 4 require only single gates whereas the signals corresponding to numerical digits, i.e., those corresponding to groups or characters 2–6, 8–12, 14–18 and 20–24 are each fed through a four gate set. The output of each set of gates is fed to one of twenty-five sets of flip-flops or bistable circuits, each set forming an individual slot or register in the intermediate storage section 25. Twenty-one of these registers have four flip-flops each to accommodate four bit digits whereas four of the registers are each single flip-flops to store the sign bits. The memory thus stores a total of eighty-eight bits of information.

In operation, the first of the twenty-five sets of gates is enabled or open while the tape reader is reading the first digit. Since the output of this set of gates is connected to the first register in intermediate storage, the signals corresponding to the first character or group are thus routed to the proper slot. This process is then repeated for each of the succeeding twenty-four characters or groups. At the end of one block, the counter having registered a count of twenty-five emits a pulse over a line 119 which is applied to the tape reader 11 to stop the reading process.

After the signals corresponding to one block of information on the tape are stored in intermediate storage, a signal may be applied to a reset transfer line 120 connected to intermediate storage to cause transfer of information stored therein to the final storage section 24 and at the same time to place the intermediate storage section 25 in its initial condition to be ready to receive signals corresponding to another block of tape. In initiating operation of the system, the signal may be applied to line 120 through a manually operated switch, not shown, and the signal may thereafter be applied automatically in a manner as described below.

After transfer of information to the final storage section 24, a start signal may be applied to the flip-flop 58 of the pulse distributor through the line 59, from a pulse source 121 through a switch 122. The pulse distributor then goes through a cycle of operation in the manner as above described, to cause generation of the pulse trains and to control the servo systems in accordance with information in final storage. At the end of its cycle of operation, the pulse distributor 19 emits the end-carry pulse which is applied through the line 35, through a delay circuit 123 and through a line 124 to the final storage section 24. The final storage section 24 is then reset to be in condition to receive another set of information from the intermediate storage section 25.

It should be noted that when the start pulse is applied from pulse source 121 through switch 122 and through line 59 to the pulse distributor, a start pulse is also applied through a line 125 to the tape reader 11, to store the information in intermediate storage 25. When the pulse distributor thereafter completes its cycle of operation, the end-carry pulse is applied through line 35 and delay circuit 123 to the final storage reset line 124 and is then applied through a delay circuit 126 to the reset transfer line 120 connected to the intermediate storage section 25. The information is again transferred from intermediate storage to final storage, and the intermediate storage section is placed in condition to receive another block of information.

The end-carry pulse is also applied through a delay circuit 127 to a program stop circuit 128 to switch a flip-flop circuit therein and to thereby apply a pulse to the line 59 to start the pulse distributor 19 and to the line 125 to start the tape reader. When the tape reader completes reading of a block of information, it normally applies a reset signal to the program stop flip-flop circuit 128, so that it may again be switched in response to the next end-carry pulse applied thereto. However, the tape reader may be arranged to respond to a program stop code on the tape, so as not to apply the reset pulse to the circuit 85 and the operation of the system will then be terminated, until reinitiated by operation of the switch 122.

The operation of the system may be manually stopped by engaging the switch contact 122 with a fixed grounded contact 129. The switch 122 together with the pulse source 121 and other control switches, as well as signal lights, meters, etc. may be mounted within a console 130 as indicated diagrammatically in FIGURE 1.

*Control pulse generation*

To apply the 100 kc. A and B pulses to the phase modulator 16, the frequency divider 29, the synchronizer 36 and the frequency divider 101, a 100 kc. master oscillator 131 is provided which may be a multivibrator connected to provide a square wave output having a frequency of 100 kc. This output is applied over leads 132 and 133 to pulse-forming circuits 134 which differentiate the rectangular wave outputs in order to derive spiked pulses at the leading and trailing edges of each rectangular pulse. In practise, this may most conveniently be accomplished by deriving a rectangular wave output over line 133 which is 180° out of phase with the output derived over line 132 as illustrated in FIGURE 1 in the waveform inserts 135 and 136, respectively. Pulse-forming circuits 134 then differentiate the leading edge of each of such waveforms to derive pulse outputs as shown in FIGURE 1 in the waveform inserts 137 and 138, respectively. Thus point A in waveform 136 coincides with pulse A in waveform 138 and similarly point B in wave form 135 coincides with pulse B in waveform 137. By differentiating the leading edge of these out-of-phase waveforms, pulse-forming circuit 134 provides one output over a line 139 which consists of the B pulses illustrated in waveform 137 and a second output over line 140 which consists of the A pulses illustrated in waveform 138. It will be apparent that there will be one A pulse and one B pulse for each cycle of the 100 kc. master oscillator output.

The B pulses developed on line 139 are applied through the line 18 to the phase modulator 16 and also through the line 32 to the frequency divider 29 as well as to the synchronizer 36. Similarly, the A pulses developed on line 140 are applied through the line 17 to the phase modulator 16 and are also applied to the frequency divider 101 to develop the reference 200 cycle square wave signal on the line 100. It will be understood that modifications and variations may be effected without departing from the spirit and scope of the novel concepts of this invention.

I claim as my invention:

1. In a circuit for generating a phase modulated signal, a frequency divider having an input and an output, a high frequency pulse source, gate means for feeding pulses from said high frequency source to said input of said frequency divider, means for generating two series of control pulses with each pulse of each series occurring at a time between pulses from said high frequency source, means for adding the pulses of one of said series to the pulses from said pulse source to create a phase lead in the output of said frequency divider, and means responsive to each control pulse of the other series for closing said gate means for a time interval sufficient to prevent application of a fixed number of pulses from said pulse source to said frequency divider to create a certain phase lag in the output of said frequency divider.

2. In a circuit for generating a phase modulated signal, means for generating first and second reference pulse signals in out-of-phase relation to each other, a frequency divider having an input and an output, gate means for feeding said first reference pulse signal to said input of said frequency divider, means for generating a series of control pulses each occurring at a time in phase with a pulse of said second reference pulse signal, means responsive to each control pulse for closing said gate means, and means responsive to the next succeeding pulse of said second reference pulse signal for opening said gate means.

3. In a circuit for generating a phase modulated signal, means for generating first and second reference pulse signals in out-of-phase relation to each other, a frequency divider having an input and an output, first gate means for feeding said first reference pulse signal to said input of said frequency divider, means for generating a series of control pulses each occurring at a time in phase with a pulse of said second reference pulse signal, a flip-flop having set and reset inputs and set and reset outputs, means connecting said reset inputs to said first gate means, a second gate means connected to said set output and having an output connected to said reset input, means applying said control pulses to said set input to set said flip-flop and close said first gate means while opening said second gate means, and means applying said second reference pulse signals to the input of said second gate means whereby the next succeeding reference pulse signal resets said flip-flop to open said first gate means.

4. In a circuit for generating a phase modulated signal, a frequency divider having an input and an output, a high frequency pulse source, gate means for feeding pulses from said source to said input of said frequency divider, a counter circuit arranged to complete a cycle of operation in response to application of a certain number of input pulses thereto, means associated with said counter circuit for generating in each cycle of operation thereof a train of output pulses equal in number to a controllable fraction of said certain number of input pulses, first and second selectively operable gates responsive to said train of output pulses, means for applying the output of said first selectively operable gate to add pulses from said train to pulses from said pulse source to create a certain phase lead in the output of said frequency divider, and means responsive to the output of said second selectively operable gate for closing said gate means in response to pulses of said train of output pulses to create a certain phase lag in the outputs of said frequency divider.

5. In a circuit for generating a phase modulated signal, a frequency divider having an input and an output, a high frequency pulse source, gate means for feeding pulses from said source to said input of said frequency divider, a counter circuit arranged to complete a cycle of operation in response to application of a certain number of input pulses thereto, means associated with said counter circuit for generating in each cycle of operation thereof a train of output pulses equal in number to a controllable fraction of said certain number of input pulses, first and second selectively operable gates responsive to said train of output pulses, means for applying the output of said first selectively operable gate to add pulses from said train to pulses from said pulse source to create a certain phase lead in the output of said frequency divider, means responsive to the output of said second selectively operable gate for closing said gate means in response to pulses of said train of output pulses to create a certain phase lag in the outputs of said frequency divider, and means for controlling the generation of said output pulses to cause each output pulse to occur at a time between pulses from said high frequency pulse source.

6. In a circuit for generating a phase modulated signal, a frequency divider having an input and an output, a high frequency pulse source, gate means for feeding pulses from said source to said input of said frequency divider, a counter circuit arranged to complete a cycle of operation in response to application of a certain number of input pulses thereto, means associated with said counter circuit for generating in each cycle of operation thereof a train of output pulses equal in number to a controllable fraction of said certain number of input pulses, first and second selectively operable gates responsive to said train of output pulses, means for applying the output of said first selectively operable gate to add pulses from said train to pulses from said pulse source to create a certain phase lead in the output of said second selectively operable gate for closing said gate means in response to pulses of said train of output pulses to create a certain phase lag in the outputs of said frequency divider, and means for controlling the generation of said output pulses to cause each output pulse to occur at a time between pulses from said high frequency pulse source, including a second frequency divider connected to said high frequency pulse source and arranged for applying input pulses to said counter circuit.

7. In a circuit for generating a phase modulated signal, a frequency divider having an input and an output, a high frequency pulse source, gate means for feeding pulses from said source to said input of said frequency divider, a counter circuit arranged to complete a cycle of operation in response to application of a certain number of input pulses thereto, means associated with said counter circuit for generating in each cycle of operation thereof a train of output pulses equal in number to a controllable fraction of said certain number of input pulses, first and second selectively operable gates responsive to said train of output pulses, means for applying to the output of said first selectively operable gate to add pulses from said train to pulses from said pulse source to create a certain phase lead in the output of said frequency divider, means responsive to the output of said second selectively operable gate for closing said gate means in response to pulses of said train of output pulses to create a certain phase lag in the outputs of said frequency divider, means including a variable frequency pulse generator for applying input pulses to said counter circuit, and synchronizing means coupled to said high frequency pulse source and arranged for controlling generation of said output pulses to cause each output pulse to occur at a time between pulses from said high frequency pulse source.

8. In a circuit for synchronizing each of the pulses of a first series of pulses with a pulse of a second series of pulses, the minimum time separation of pulses of the first series being greater than the maximum time separation of pulses of the second series, a flip-flop having set and reset inputs and set and reset outputs, means for applying said first series of pulses to said set input, gate means having an input and an output and coupled to said set output to transmit signals when said flip-flop is set by a pulse of said first series, means for applying said second series of pulses to said input of said gate means, means coupling the output of said gate means to said reset input of said flip-flop, and an output circuit coupled to said reset output of said flip-flop.

9. Apparatus for deriving a predetermined number of pulses in an adjustably predetermined time interval comprising, a counting circuit comprising a plurality of cascaded bistable circuits each having means to provide a non-carry output pulse whenever its own state is changed without changing the state of the next following bistable circuit, a pulse generator for providing a sequence of pulses to a cascaded series of countdown circuits, means to selectively apply pulses from an input or an output of one of said countdown circuits to the input of said counting circuit, means to derive a predetermined number of said non-carry output pulses from said counting circuit during each cycle of its operation, and adjustable means to vary the frequency of said pulse generator.

10. In digital data processing apparatus, means to generate a predetermined number of pulses in a predetermined time interval in accordance with program instructions and manually operated means to vary said time interval called for by said program instructions comprising, a first counting circuit, a pulse generator for producing a sequence of pulses of predetermined frequency, means to apply said pulses to a cascaded series of countdown circuits, program controlled means to selectively apply pulses from an input or an output of one of said countdown circuits to the input of said first counting circuit, program controlled means to derive a predetermined number of pulses from said first counting circuit during each cycle of its operation, and manually adjustable means to vary the frequency of said pulse generator.

11. Apparatus for synchronizing each of the pulses of a series of randomly recurring pulses with one of a series of regularly recurring pulses of predetermined frequency comprising, a coincidence "and" gate having first and second input terminals and an output terminal at which a signal appears only when signals are simultaneously applied to both said first and second input terminals, means to apply said series of regularly recurring pulses of fixed frequency to a first of said input terminals, means connecting said output terminal to the binary trigger input terminal of a first bistable circuit, means connecting the reset output terminal of said first bistable circuit to the reset input terminal of a second bistable circuit, means connecting the set output terminal of said second bistable circuit to said second input terminal of said coincidence "and" gate circuit, means to apply said randomly recurring sequence of pulses to the set input terminal of said second bistable circuit, and means to derive said synchronized output signal from the reset output terminal of said second bistable circuit.

12. Means to synchronize each of a series of randomly recurring pulses with one of a series of regularly recurring pulses comprising, a coincidence "and" gate circuit having first and second input terminals and an output terminal, means to apply said regularly recurring sequence of pulses to the first of said input terminals, bistable means having one output terminal connected to the other input terminal of said "and" gate to normally hold said gate in a closed position, said bistable means being responsive to the application thereto of one of said randomly recurring pulses to open said normally closed gate, means connected to the output of said gate and responsive to one of said regularly recurring pulses to apply to said bistable means a signal to return it to its normal state in which said gate is held closed, said bistable means being responsive to the application thereto of said last-named signal to produce an output signal, said output signal being a pulse synchronized in time with the pulse which passed through said open "and" gate from its said first terminal to initiate restoration of said bistable device to its said normal state.

13. Digitally operated phase modulating apparatus comprising, first and second countdown circuit each having a countdown ratio equal to the same integral number $n$, each of said circuits being connected to provide an output signal which is a rectangular wave in response to input signals comprising trains of pulses, a first source of regularly recurring reference pulses of predetermined fixed frequency $f$, means to apply the pulses from said first source to said first countdown circuit to provide a reference output signal having a frequency equal to a $f/n$, a second source of irregularly recurring information pulses, means to prevent the time coincidence of any of said information pulses with any of said reference pulses, and means to apply both said reference pulses and said information pulses to said second countdown circuit, the output of said second countdown circuit being advanced in phase by $360°/n$ with respect to the reference output of said first countdown circuit by each of said information pulses applied to said second countdown circuit.

14. Digitally operated phase modulating apparatus comprising, a first source of regularly recurring reference pulses of fixed frequency $f$, a second source of irregularly occurring information pulses, a third source of irregularly occurring information pulses, means to prevent the time coincidence of any of the pulses from either said second or said third source of information pulses with any of the pulses from said first source of reference pulses, a countdown circuit having a countdown ratio equal to an integral number $n$, a normally open gate circuit having an output connected to said countdown circuit, means to apply both said reference pulses from said first pulse source and said information pulses from said second pulse source to said normally open gate circuit, control means responsive to the application thereto of one of said information pulses from said third pulse source to close said normally open gate circuit, and means synchronized with said first source of reference pulses to re-open said gate circuit after the occurrence of one of said reference pulses, whereby the phase of the output of said countdown circuit is modified by $360°/n$ by each of said information pulses, with pulses from said second source advancing said phase and pulses from said third source retarding said phase.

15. Apparatus for synchronizing each of a train of randomly occurring pulses with one pulse in a train of fixed frequency pulses comprising, a gate circuit having first and second input terminals and an output terminal connected to provide an output signal only in response to the simultaneous application of input signals to both said first and second input terminals, means to apply said train of regularly recurring pulses to said first input terminal, a first bistable circuit, means to apply each of said randomly recurring pulses to the set input terminal of said bistable circuit, means to apply to said second input terminal of said gate circuit a signal derived from the set output terminal of said first bistable circuit so that said gate is enabled when said first bistable circuit is in its set condition, means connecting said output terminal of said gate circuit to the binary input terminal of a second bistable circuit, means connecting the reset output terminal of said second bistable circuit to the reset input terminal of said first bistable circuit, and means to derive a synchronized output pulse from the reset output terminal of said first bistable circuit.

16. Digitally operated phase modulating apparatus comprising, a first source of regularly recurring reference pulses of fixed frequency $f$, a second source of irregularly occurring information pulses, a third source of irregularly occurring information pulses, means to prevent the time coincidence of any of the pulses from either said second or said third source of information pulses with any of the pulses from said first source of reference pulses, first and second countdown circuits each having a countdown ratio equal to the same integral number $n$, each of said circuits being connected to provide an output signal which is a symmetrical waveform in response to input signals comprising trains of pulses, means to apply said reference pulses from said first pulse source to said first countdown circuit to provide a reference output signal, a normally open gate circuit having an output connected to said second countdown circuit, means to apply both said reference pulses from said first pulse source and said information pulses from said second pulse source to said normally open gate circuit, control means comprising a bistable circuit responsive to the application to a first input terminal thereof of one of said information pulses from said third pulse source to close said normally open gate circuit, and means to apply pulses having predetermined time relationship with the pulses from said first source of reference pulses to a second input terminal of said bistable circuit to reopen said gate circuit after the occurrence of one of said reference pulses, whereby the phase of the output of said second countdown circuit with respect to the output of said first countdown circuit is modified by 360°/n by each of said information pulses, pulses from said second source advancing said phase and pulses from said third source retarding said phase.

17. A director adapted to actuate an analogue servomechanism in accordance with coded digital program information comprising, input mans adapted to convert said coded program information into a series of discrete electrical pulses, a data distributor control connected to apply preselected groups of said input pulses to preselected registers of an intermediate storage element, a final storage element connected to receive the information stored in said intermediate storage element upon the application thereto of a transfer pulse, a pulse distributor connected to generate a predetermined number of pulses in a predetermined time interval in accordance with the information stored in said final storage element, said pulse distributor also being connected to generate a carry pulse at the end of said predetermined time interval to be applied to said intermediate storage element to cause the transfer of the information therein to said final storage element, an output gating matrix, the individual gates of said matrix being enabled or disabled in accordance with the information contained in said final storage element, means to apply the output from said pulse distributor to said gating matrix, a master oscillator, means connecting said master oscillator to provide input driving pulses to actuate said pulse distributor, a digital phase modulator, means to apply pulses derived from said master oscillator to said phase modulator; a first countdown circuit means connected to apply pulses from said master oscillator to said countdown circuit to provide a reference output signal which is a rectangular wave; said phase modulator comprising a second countdown circuit connected to provide a rectangular wave output signal to be modulated, and means to apply the pulses from said output gating matrix to said countdown circuit of said phase modulator to modify the phase of its output by a predetermined amount for each of said pulses applied thereto from said output gating matrix.

18. A director adapted to directly actuate an analogue servo-mechanism in accordance with digitally encoded program information comprising, a master oscillator connected to provide first and second trains of pulses of predetermined frequency, said first train of pulses being 180° out of phase with said second train of pulses; a countdown circuit, means to apply said first train of pulses to said countdown circuit, said countdown circuit being connected to provide a reference output signal which is a symmetrical waveform, a phase modulator, means to apply said first train of pulses of said phase modulator, said phase modulator being connected to provide an output signal which is a symmetrical waveform, pulse distributor means to generate a predetermined number of pulses in a predetermined time interval in accordance with said digitally encoded input information, synchronizing means to synchronize each of said predetermined number of pulses with one of the pulses in said second train of pulses from said master oscillator, and means to apply said synchronized pulses to said phase modulator circuit to phase modulate the output thereof with respect to said reference output signal by an amount proportional to the number of said predetermined number of pulses.

19. Apparatus as in claim 18 wherein said synchronizing means comprises a gate circuit connected to directly apply said second train of pulses to an input of said pulse distributor.

20. Apparatus as in claim 18 wherein said synchronizing means comprises a separate circuit having said second train of pulses and the output of said pulse distributor both applied thereto as inputs and providing said synchronized pulses as its output.

21. Apparatus as in claim 20 and further including manually adjustable means to vary the length of said predetermined time interval in which said predetermined number of pulses are produced.

22. Apparatus for producing a unidirectional voltage having a magnitude and polarity indicative of the phase difference between first and second trains of rectangular waves comprising, first and second sources of rectangular waves, first and second inverting pulse amplifiers, first and second bistable circuits, each of said bistable circuits having a set input terminal and a reset input terminal, means to apply the output from said first source of rectangular waves both to said first pulse amplifier and to the reset input terminal of said first bistable circuit, means to apply the output from said second source of rectangular waves both to said second pulse amplifier and to the reset input terminal of said second bistable circuit, means to apply the output of said first pulse amplifier to the set input terminal of said second bistable circuit, means to apply the output of said second pulse amplifier to the set input terminal of said first bistable circuit, a summing amplifier, means to apply to one input of said summing amplifier an output derived from a reset output terminal of said first bistable circuit, means to apply to another input terminal of said summing amplifier an output derived from a set output terminal of said second bistable circuit, and means to derive the average value of the output signal of said summing amplifier as a measure of the phase difference between said first and second trains of rectangular waves.

References Cited

UNITED STATES PATENTS

| | | | |
|---|---|---|---|
| 2,475,245 | 7/1949 | Leaver et al. | 318—162 |
| 2,537,770 | 1/1951 | Livingston et al. | 318—162 |
| 2,935,692 | 5/1960 | Cohen | 328—34 |
| 2,835,805 | 5/1960 | Posthumus | 328—34 |
| 3,117,220 | 1/1964 | Wensley | 235—157 |
| 3,094,609 | 6/1963 | Weiss | 235—157 |
| 2,998,190 | 8/1961 | Rosenberg | 235—151 |
| 2,714,705 | 8/1955 | Volz | 332—14 |
| 2,833,941 | 5/1958 | Rosenberg | 235—151.11 XR |

MALCOLM A. MORRISON, *Primary Examiner.*

STEPHEN W. CAPELLI, *Examiner.*

L. W. MASSEY, K. W. DOBYNS, *Assistant Examiners.*